Oct. 12, 1965    J. C. COTTIN    3,211,978
PROGRAMMED ELECTRO-HYDRAULIC CONTROL DEVICE
Filed April 30, 1962    3 Sheets-Sheet 1

United States Patent Office 3,211,978
Patented Oct. 12, 1965

3,211,978
PROGRAMMED ELECTRO-HYDRAULIC
CONTROL DEVICE
Jean Claude Cottin, Chateauneuf-en-Thymerais, France, assignor to Produmatic a Société à Responsabilite Limitée, Chateauneuf-en-Thymerais, Eure-et-Loir, France
Filed Apr. 30, 1962, Ser. No. 190,957
Claims priority, application France, Jan. 29, 1962, 886,203, Patent 1,322,193
9 Claims. (Cl. 318—162)

This invention relates to automation and has specific reference to an electro-hydraulic control device adapted to command a series of movements according to a predetermined and modifiable programme.

This control device is suitable for performing many machining operations such as boring, drilling, surfacing, milling, tapping, contour copying, etc. . . . and also for other metal-working and assembly operations such as bending, folding, pressing, hot- and cold-riveting, rolling, etc. . . .

It is also applicable in handling apparatus for obtaining an accurate positioning. Finally, this device is also useful each time it is necessary to make certain components of an apparatus or machine responsive to combined or organized movements according to a predetermined cycle modifiable in time.

It is the scope of the present invention to substitute a device of the character broadly set forth hereinabove either for a camshaft with its control means as usually incorporated in conventional mechanical automatic machines, or for a worm-and-gear unit. To this end the programmed electro-hydraulic control device according to this invention is characterized in that it comprises two separate but operatively interconnected sections, namely, a driving or power section and a working section responsive to the former, and that said working section comprises at least one programming rod actuating a cooperating contact during the relative displacement between said programming rod and said contact as a working cycle proceeds, the longitudinal contour of said programming rod being designed as a function of the switching steps necessary for carrying out the working programme.

Utilizing one or more programming rods is advantageous in comparison with hitherto known cam systems in that these programming rods are easily interchangeable. On the other hand they are absolutely rigid and trouble-free, and thus any risk of misadjustment likely to result from the use of abutment system is precluded.

Another advantageous feature characterizing the device of this invention is that the connections between the power section and the working section or sections are easily modifiable. Therefore, the power section can be replaced without difficulty so that it is possible, for controlling a certain number of working sections, or units, to use a smaller number of power sections if all the working sections are not to operate simultaneously. It is sufficient, according to requirements, to displace the power sections and to connect them to the working sections to be operated. Thus, a great flexibility of operation is obtained.

In order to afford a clearer understanding of this invention and of the manner in which the same may be carried out in practice, a typical embodiment thereof will be described hereafter with reference to the accompanying drawings. In the drawings.

Figure 1:
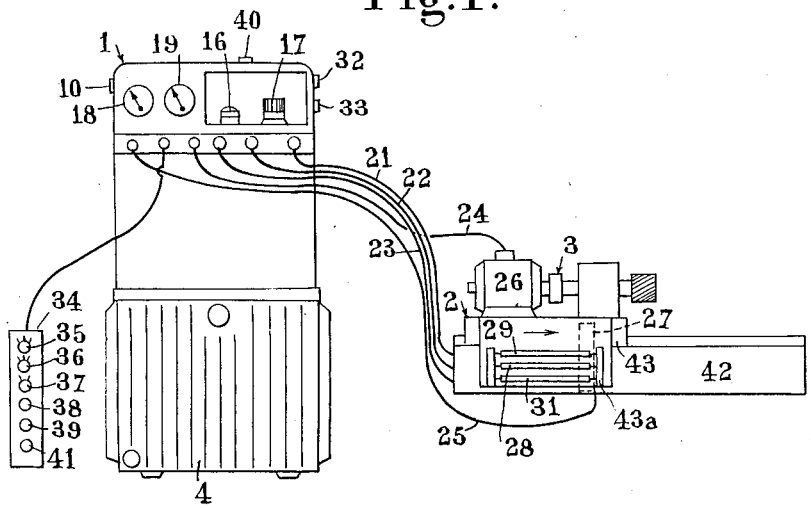
FIGURE 1 is a diagram illustrating the principle of an installation according to this invention.

In FIG. 1, the device of this invention is divided into two main sections, that is, a power section designated in general by the reference numeral 1, and a working section 2 controlled by the power section 1. In the example illustrated diagrammatically by way of example the working section operates an electro-mechanical milling head 3, but it is clear that other apparatus can be controlled in lieu thereof without departing from the spirit and scope of the invention.

The power unit 1 comprises an oil reservoir 4 having cooling fins on its outer walls, and a pumping unit comprising an electromotor 5 (FIG. 3) rotatably driving two pumps 6, 7, these component elements 5, 6 and 7 being mounted on a plate constituting a cover closing tightly the oil reservoir 4.

Figure 3:
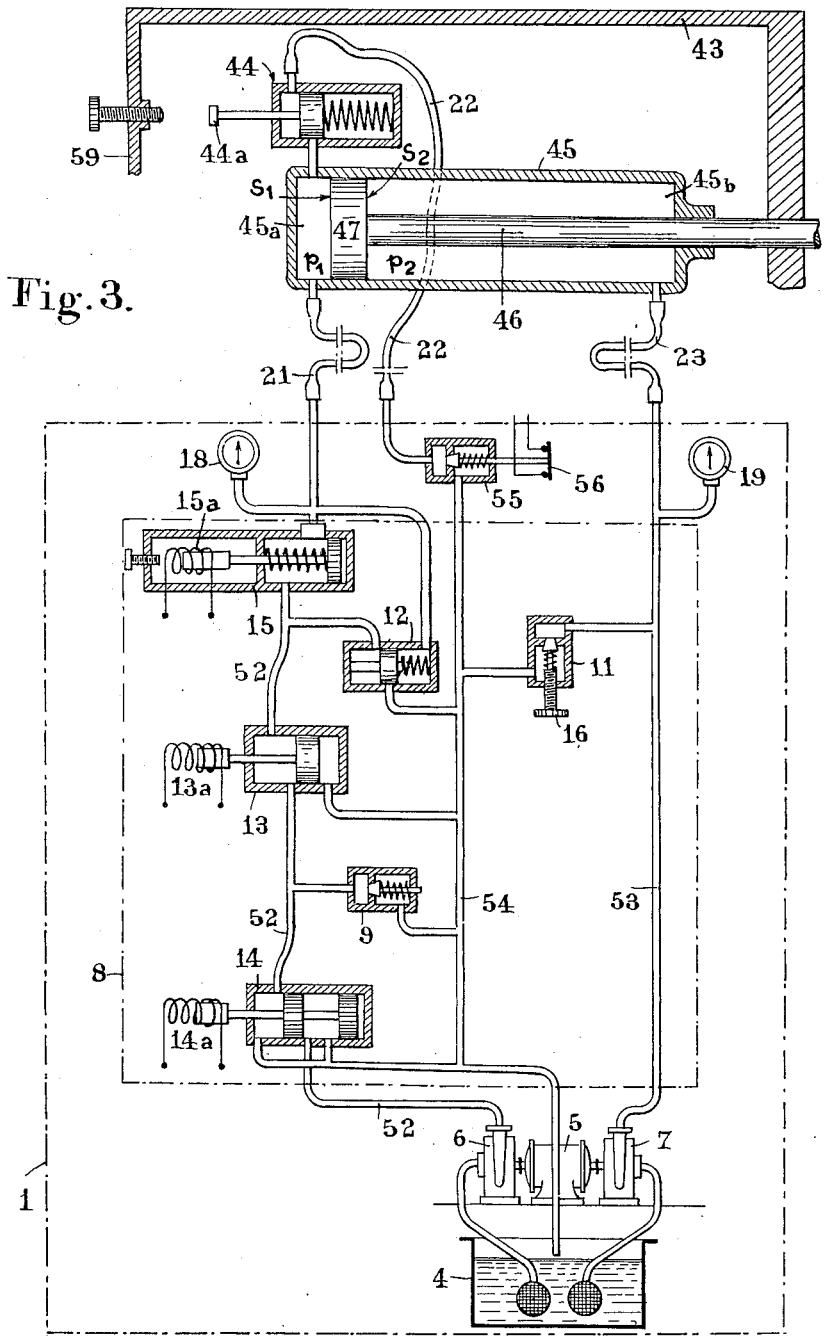
FIGURE 3 is a diagram illustrating the hydraulic circuit of the installation.

The power section 1 further comprises a control unit shown in block form at 8 in FIG. 3. This unit comprises three spring-loaded valves 9, 11 and 12 having calibrated springs, and three solenoid-operated valves 13, 14 and 15 assembled according to the so-called "sandwich" assembly method. The component elements of the control unit 8 will be described more in detail presently with reference to FIG. 3.

The power section 1 comprises in addition a fluid tight equipment box enclosing contactors and relay means for properly timing the functions and control actions (see FIG. 4), and also a control board. Mounted on this control board is a knurled knob 16 for adjusting at will the calibration of the spring loading the valve 11 (FIG. 3), that is, the reaction pressure or counter-pressure in the hydraulic cylinder 45, together with a vernier 17 for adjusting the output through the valve 12 and therefore (as will be explained presently) the velocity of operation or working rate of the machine. This control board also comprises pressure gauges 18 and 19 for checking the pressures in the working and counter-pressure circuits, a safety shunt 10 incorporated in the electrical circuit and a push-button 40 for starting the pump-driving motor 5.

Three flexible or rigid hydraulic pipe lines 21 (feed pressure), 22 (connected to the limit stop) and 23 (counter pressure) extend from the power section 1, pipe lines 21 and 23 being connected to the hydraulic cylinder 45 of the working unit 2. In addition, the power section 1 is connected to the working unit 2 through electrical conductors 24 and 25, conductor 24 being connected to an electromotor 26 of the working unit, if necessary, the other conductor 25 being connected to a contactor set 27 comprising switches 48, 49 and 51 actuated by the programming rods 28, 29 and 31 of the working unit.

Finally, the power section comprises two terminals 32, 33 adapted to be connected either to each other or to other power sections operating either upstream or downstream, in the case of composite movements, terminal 32 being adapted to emit a signal and terminal 33 to receive a signal.

The power section 1 is controlled by means of a push-button box 34 comprising a three-position spindle selector push-button 35 for controlling the electromotor 26 of the working unit, if necessary; the three positions of selector 35 correspond to the ON and OFF positions of the electromotor and to the automatic control of this motor, respectively. The push-button box 34 further comprises a three-position cycle selector and push-button 36 for controlling the feed cycle of the hydraulic cylinder 45 of working unit 2; these three positions corresponding to the stoppage at the end of the working stroke, to the automatic operation and to the operation by separate strokes of the machine, respectively. The two-position emission selector push-button 37 has a twofold function: in the first position, which corresponds to the operation "with signal emission," it is possible during a cycle to emit a signal utilized for starting the cycle of another group or for any other desired function, while in the second position corresponding to the operation "without signal emission" no signal is emitted. Finally, the control push-button box 34 comprises a push-button 38 for the impulse or stroke-by-stroke operation, the push-button 39 for starting the cycle and the push-button 41 for complete instantaneous stoppage.

The working unit 2 comprises a stationary base member 42 having slidably mounted thereon a carriage 43 supporting the working unit consisting in the example illustrated of a milling head 3. This sliding carriage also carries (FIG. 3) a micrometric adjustable stop 59 actuating, as will be explained presently, at the end of the feed stroke of carriage 43, a limit valve 44. The carriage 43 is driven by means of a hydraulic cylinder 45 (FIG. 3) having its cylinder body rigid with the base member 42 and the rod 46 of its piston 47 attached to the carriage 43, as shown.

Figure 2:
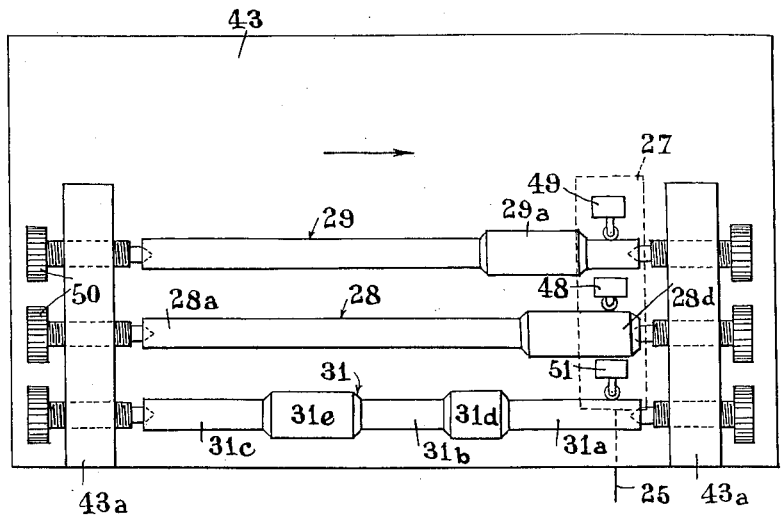
FIGURE 2 is an elevational view showing on a larger scale the set of programming rods mounted on a working section or unit.

As will be clearly understood from FIG. 2, the carriage 43 of working unit 2 carries the aforesaid three programming rods 28, 29 and 31 controlling three micro-switches 48, 49 and 51 constituting the contactor set 27. These three programming rods mounted on two supports 43a rigid with the carriage 43 are held against movement by screws 50 provided with lock nuts (not shown).

As will be seen presently, the programming rod 28 is adapted to start and stop the electromotor 26 which may be mounted if desired on the carriage 43, as well as to control the limited backward movement of this carriage. The programming rod 29 controls the emission of signals during the cycle. Finally, the programming rod 31 controls the change in the rate of travel of the carriage between a fast approach feed and a slow working feed.

Now reference will be made more particularly to FIG. 3 with a view to describe the hydraulic circuit of the installation. The pumps 6, 7 driven from the motor 5 deliver fluid under pressure into the pipe lines 52 and 53 of the driving section 1. Pipe line 52 is connected through a flexible duct 21 to one of the chambers 45a of hydraulic cylinder 45 via the successive solenoid-operated valves 14, 13 and 15, and pipe line 53 is connected directly via the flexible duct 23 to the other chamber 45b of this cylinder. The spring-loaded valve 9 provided with a calibrated spring is inserted between the line 52 and the common return line 54 leading back to the oil sump 4. This valve 9 operates as an adjustable safety valve.

The valve 11 also provided with a calibrated spring is inserted between the pipe line 53 and the return line 54 leading back to the oil sump. The adjustment of this valve may be modified by means of a knurled button 16 with a view to regulate the counter-pressure $p_2$ in the chamber 45b of cylinder 45.

After the operator has properly adjusted the valves 9, 11 and positioned the three programming rods 28, 29 and 31 on carriage 43, the equipment is ready to carry out alone a cycle of operation according to the programme given by the programming rods illustrated on a larger scale in FIG. 2. In this figure it will be seen that the programming rod 31 actuating a fixed contact 51 comprises a plurality of sections 31a, 31b and 31c of smaller diameter and a plurality of swells 31d, 31e of larger diameter. The sections 31a, 31b and 31c in this example correspond to a fast feed of the carriage and the swells 31d, 31e correspond to a slower working feed. The fast and slow feed strokes are therefore respectively proportional to the lengths of sections 31a, 31b, 31c on the one hand, and to swells 31d, 31e on the other hand.

The programming rod 28 controls the starting and stoppage of the spindle motor 26 carried by the carriage 43. This programming rod actuates the micro-switch 48 and to this end the rod 28 comprises a small-diameter section 28a and a large-diameter swell 28d actuating the micro-switch 48 for starting the motor 26. In this case the motor 26 is started only during the feed motion (fast and slow movements) and the return stroke (fast backward movement), and it is stopped when the carriage 43 is stopped after completing its return stroke. The backward movement of the carriage may either take place upon completion of its stroke or be limited as will be explained presently as a function of the position of the swell 28d on the programming rod 28.

The third programming rod 29 controls the emission of a signal during the backward movement of carriage 43 in order to start, if necessary, another group performing a different machining or like step in combination with the group contemplated herein, or to start another cycle of the same group or produce any other desired function. To this end the rod 29 controls with its swell 29a the micro-switch 49.

As will be explained presently, the signal for starting the operation of a group may be obtained either by direct manual control or from another group or any other suitable source. Thus, by operatively coupling $n$ groups, a cascade operation can be obtained, one group controlling the starting of the following group by means of a signal delivered at the end of the cycle.

It is also possible to operate a single group during successive cycles by connecting the terminal 32 (which in this case emits a signal indicating the end of a cycle) to the terminal 33 receiving this signal. Thus, the group becomes self-operating.

Now reference will be made to FIG. 3 to describe the operations of the hydraulic circuit. The solenoid-operated valves 13, 14 and 15 are shown in their inoperative, that is, de-energized condition.

The pump 6 driven from the electromotor 5 is either of the constant-output type or of the variable-output type, the pressure being limited by the check valve 9. In the inoperative condition the cycle valve 14 will switch the output of pump 6 and that of chamber 45a to the line 54 returning the fluid to the reservoir 4. Similarly, the output of pump 7 which is also either a constant-output pump or a variable-output but constant pressure pump is switched from pipe line 53 through the calibrated-spring valve 11 to line 54 returning the fluid to the reservoir. The discharge valve 11 permits of adjusting the counter-pressure $p_2$ exerted in the chamber 45b of cylinder 45. This counter-pressure $p_2$ acts like a constant-load spring. It provides a twofold function, as will be explained presently, namely a fast backward movement and the stabilization of the feed during the fast approach feeds and the slow working feeds.

When it is desired to obtain a faster feed the winding 14a of the solenoid-operated cycle valve 14 is energized through means to be described presently. In this case the solenoid-operated valve 14 permits the passage of the output from pump 6 through line 52 and the flexible duct 21 toward the chamber 45a of cylinder 45, through the impulse valve 13 and output-regulating valve 15 in their inoperative condition. The pressure $p_1$ prevailing in chamber 45a causes the piston 47 and rod 46 rigid with carriage 43 to travel in relation to the cylinder body 45 rigid with the base member 42. The carriage 43 as well as the milling head 3 will thus travel at a fast rate toward the workpiece.

When the machining step proper is to take place the necessary slow feed is obtained by energizing the winding 15a of the output-regulating solenoid-operated valve 15. Thus, one fraction of the output from pump 6 in line 52 flows toward the cylinder 45 and the remaining fraction thereof is switched toward the line 54 returning the fluid to the reservoir 4 through the valve 12 automatically as a function of the constriction regulated in valve 15 by the energization of its solenoid winding. The working pressure $p1$ is established as a function of the effort to be exerted by the tool. Due to the counter-pressure $p2$ the piston 47 is constantly under load, so that it can work by "pushing" or by "swallowing" in the case of a milling operation. Actually, no hydraulic effect is required.

At the end of the working stroke, the solenoid-operated valves 14 and 15 being energized, the adjustable stop 59 actuates the plunger 44a of the limit valve 44. This normally closed valve 44 will thus open to restore the pressure in chamber 45a of cylinder 45 to a value $p1$ such that $p1 \times S1 = p2 \times S2$ (S1 and S2 being the useful surface areas of piston 47). Therefore, piston 47 is stopped in a state of equilibrium and is held in position between the pressures $p1$ and $p2$.

When at the end of a working stroke the valve 44 is moved to its open position the oil output flows through this valve in the flexible duct 22 toward the pipe line 54 back to the reservoir. This output causes the actuation of a valve 55 controlling the end of the working stroke. This valve 55 opens a back contact 56 when the oil flows through it.

To cause a quick backward movement of the piston 47 and of its rod 46, the solenoid-operated valves 13, 14 and 15 are de-energized so that the output of pump 6 is returned to the reservoir 4 through the solenoid-operated valve 14. The counter-pressure $p2$ prevailing in chamber 45b causes a quick return of piston 47 to its inoperative position since the pressure $p1$ is released and the oil contained in chamber 45a returns to the reservoir 4 through the solenoid-operated valve 14.

The device can be stopped during the operation as the forward or backward stroke takes place, by energizing the winding 13a of the stroke-by-stroke solenoid-operated valve 13 whereby the output in pipe line 52 is diverted to the pipe line 54 and any oil contained in chamber 45a remains trapped therein. Then the pump 7 will block the piston 47 hydraulically. When the stroke-by-stroke solenoid-operated valve 13 is again de-energized, the initial conditions are restored and the cycle is resumed.

Now the operation of the complete installation will be described with specific reference to the wiring diagram of FIG. 4. In this diagram the electromotor 5 driving the pumps 6, 7 and the spindle motor 26 of the milling head 3 are energized from the three-phase mains RST through thermal cut-outs 66 and 67. This energization is controlled through contacts 61b and 62b of relays 61 and 62 respectively. These relays are energized (as well as the stroke-by-stroke relay 63, cycle relay 64 and output regulating relay 65) from a transformer 60 having its primary connected across two phases of the mains. The relays 63, 64 and 65 control respectively the front contacts 63b, 64b and 65b connected in series with the windings 13a, 14a and 15a of the relevant solenoid-operated valves 13, 14 and 15. Relay 64 is connected in series with a front contact 64a provided for the self-energization of this relay, and comprises on the other hand the back contact 64c connected to the energizing circuit of relay 63 and the back contact 64d mounted in series with the emission contact 49 of the emission terminal 32.

Figure 4:
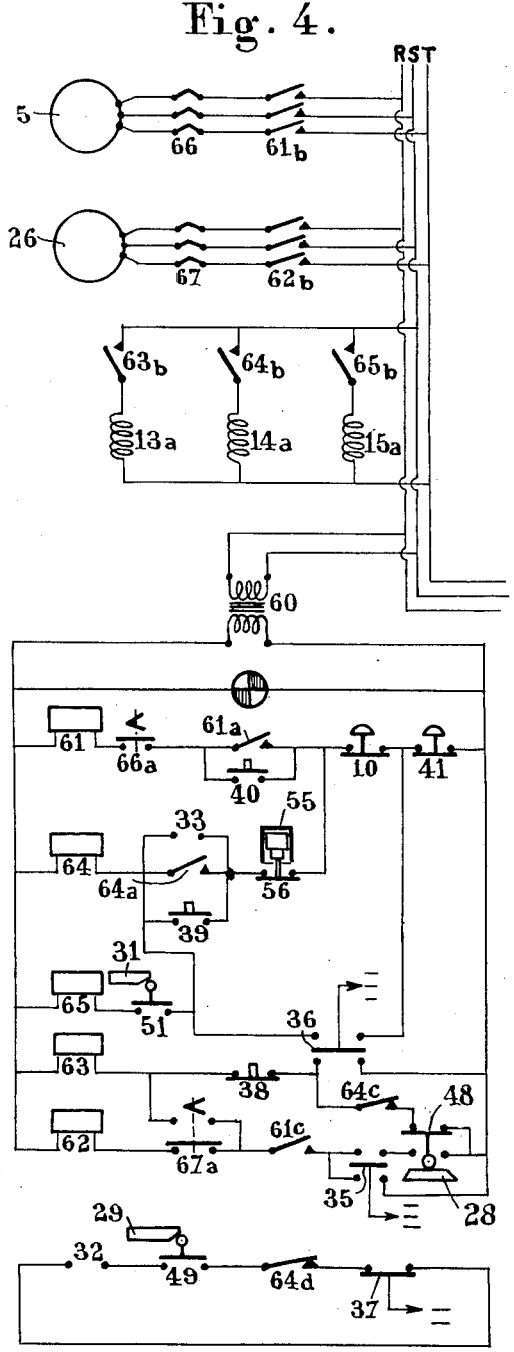
FIGURE 4 is a wiring diagram of the electrical circuitry.

In FIG. 4 the three micro-switches 48, 49 and 51 actuated by the programming rods 28, 29 and 31 respectively are also shown.

This installation operates as follows:

To energize the circuit the operator inserts the safety shunt 10 in the circuit for energizing the relay 61. Then the electromotor driving the pumps 5 can be started. To this end the operator depresses the push-button 40, thus energizing this relay 61 since the emergency stop contact 41 is closed as well as contact 66a of the thermal cut-out 66. The relay 61 is kept in its energized condition by its holding contact 61a. The energization of relay 61 causes the contacts 61b to close, whereby the motor 5 is energized. Thus, the front contact 61c inserted in the circuit for energizing the relay 62 is closed.

A simple automatic cycle takes place as follows:

The cycle may be started either by depressing the push-button 39 or by means of a signal received by terminal 33, this signal closing the circuit across the two studs of this terminal. These two actions are similar and cause the energization of relay 64 which is kept in this condition by its front contact 64a through the contact 56 responsive to the valve 55 controlling the end of the stroke. Thus, the back contacts 64c and 64d are open. The energization of relay 64 causes the closing of contact 64b and the energization of winding 14a of the cycle-controlling solenoid-operated valve 14. In the foregoing, during the explanation of the hydraulic diagram, it was disclosed that this valve causes the feed of carriage 43 at a fast rate since the contact 51 actuated by the programming rod 31 is open, so that the relay 65 and winding 15a of the solenoid-operated valve 15 are not energized.

After a certain feed stroke the swell 28d of programming rod 28 causes the switch 48 to move to the opposite position in which it closes the lower contact inserted in the circuit for energizing the relay 62. Then the latter may be energized since its contact 61c is closed, the spindle selector 35 (which is in the automatic control position) closing the upper contact inserted in the energizing circuit of relay 62 while the contact 67a of the thermal cut-out 67 associated with the spindle motor 26 is also closed. The contacts 62b will thus close, so that the spindle motor 26 is energized.

Some time later the swell 31d of the programming rod 31 controlling the feed movements closes the microswitch contact 51. Thus, relay 65 is energized through contacts 51, 64a, 56, 10 and 41 now closed. As a result, contact 65b is closed and therefore the winding 15a of the output regulating solenoid-operated valve 15 is energized. The rate of feed is thus reduced during the complete working period as defined by the length of the swell 31d on rod 31.

From the foregoing it is clear that during the travel of the carriage the swells 31d, 31e, etc. . . . of the programming rod 31 control the slow working feeds whereas the section 28a of programming rod 28 controls the cycle section during which the spindle motor is energized.

At the end of the working stroke the stop 59 opens the valve 44 (FIG. 3) and the oil escaping from this valve actuates the valve 55 controlling the end of the stroke. As a result, contact 56 is open, so that the energization of relay 64 is discontinued. Contacts 64a and 64b are open. The cycle-controlling solenoid-operated valve 14 resumes its inoperative position and the pressure $p1$ is no more transmitted to cylinder 45. Relay 65 is also de-energized so that contact 65b opens. As both solenoid-operated valves 14 and 15 are de-energized, the piston in the hydraulic cylinder 45 is rapidly returned to its initial position until it engages the limit stop associated therewith.

When it is desired to operate the servo-controlled machine, for example the milling head 3, by separate strokes instead of continuously, the selector 36 is moved to its "stroke-by-stroke" position in which it closes the lower contact inserted in the energizing circuit of relay 63. As the stroke-by-stroke push-button contact 38 is a back contact, relay 63 is energized, contact 63b is closed and the stroke-by-stroke solenoid-operated valve is energized. The working cycle is started as before by depressing the cycle-starting push-button 39 to energize the relay 64 as well as the solenoid winding of the cycle valve 14. If the pressure is more or less maintained on the stroke-by-stroke push-button 38, relay 63 becomes de-energized and thus contact 63b opens to de-energize the stroke-by-stroke solenoid-operated valve 13. Thus, the normal feed conditions are restored. When the stroke-by-stroke push-button 38 is released, relay 63 is again energized, contact 63b is closed and the winding of valve 13 is energized. Thus, the forward or backward travel of piston 47 is stopped. Therefore, the complete cycle can be performed by means of pulses.

Now the case of automatic cycle operation with limited backward travel will be considered. It is assumed that the installation operates under automatic cycle conditions, that is, with the selector 36 in its intermediate position in which no contact is closed. During the fast backward movement the swell 28d of programming rod 28 actuates the switch 48 to open the lower contact inserted in the energizing circuit of relay 62. Thus, the latter is de-energized, contact 62b is open and the spindle motor 26 is no more energized. The actuation of switch 48 closes the upper contact inserted in series with the contact 64c and the stroke-by-stroke push-button 38 in the circuit through which relay 63 is energized. As a result, the energization of this relay is obtained, so that contact 63b is closed and the winding 13a of the stroke-by-stroke solenoid-operated valve 13 is energized. Thus, piston 47 is stopped and the desired premature stoppage of the backward stroke is obtained. The next cycle may be restarted by either depressing the cycle-controlling push-button 39 or applying a signal to the reception terminal 33.

This action is particularly useful for avoiding a complete backward travel at each cycle. The limit stroke is thus utilized for normal operation (short cycle), the complete backward stroke being utilized for instance for changing the tool.

The control of the working unit spindle is synchronized by means of the three-position selector 35. These three positions are: full stop (open contacts), continuous operation (lower contact closed), automatic operation (upper contact closed). In the case of automatic operation, if the unit is already stopped the contact 48 is in its front position to close the contact in series with contact 64c. Relay 62 is not energized and the spindle motor 26 is stopped. If the unit is started, switch 48 is transferred to its inoperative position in which it energizes relay 62. Thus the spindle motor is energized.

The electrical circuit further comprises two safety devices, namely, one for the pump motor 5 and one for the spindle motor 26. A thermal relay 66 inserted in the circuit for energizing the pump motor 5 opens in case of emergency. When the safety contact 66a opens, relay 61 is de-energized and the pump motor 5 is stopped. As contact 61c is also opened, relay 62 is de-energized and the spindle motor 26 is stopped.

A thermal relay 67 inserted in the feed circuit of spindle motor 26 opens in case of emergency. As the safety contact 67a opens, relay 62 is no more energized and the spindle motor 26 is stopped. However, since contact 67a is transferred to a position in which it closes the contact inserted in the energizing circuit of relay 63, the latter becomes energized, contact 63b is closed and the stroke-by-stroke solenoid-operated valve 63b is energized. As the piston 47 is held against motion the unit is inoperative.

The signal emitting circuit comprises a two-position selector 37 for emitting or not a signal. This signal is utilized by the same group if the signal emitting terminal 32 is connected to the signal receiving terminal 33 of this group for starting a new cycle. This signal may also be directed toward another group. It may be used for any other function such as safety, alarm, synchronization, etc. . . . Thus, a cascade operation is obtained. The signal is emitted as a consequence of the actuation of microswitch 49 by the programming rod 29 during the backward stroke, contact 64d being closed only during this stroke.

On the other hand, it is clear that the form of embodiment of the invention, which is described by way of example hereinabove with reference to the accompanying drawings should not be construed as limiting the invention as many modifications may be brought thereto without departing from the spirit and scope of the invention as set forth in the appended claims.

What I claim is:

1. Programmed electro-hydraulic control device for automatically performing various operations during a working cycle, which comprises two separate operatively interconnected sections, namely, a power section and a working section driven by said power section, said working section comprising at least one programming rod and at least one contact actuated by said programming rod, means for causing a relative displacement between said programming rod and said contact during the working cycle, the longitudinal contour of said programming rod being determined as a function of the switching operations that are necessary for carrying out the working programme, a set of hydraulic flexible ducts and a set of flexible electrical conductors interconnecting said power section and said working section, a movable carriage in said working section, a hydraulic cylinder comprising two chambers and controlling the displacement of said movable carriage, means for producing a hydraulic feed pressure, a feed-pressure hydraulic circuit for transmitting the feed pressure to one of said chambers, means for producing a constant hydraulic counter-pressure and a hydraulic counter-pressure circuit for transmitting said constant counter-pressure to the other chamber of said hydraulic cylinder.

2. Device according to claim 1, comprising a first pump delivering a fluid under pressure to said feed-pressure hydraulic circuit, another hydraulic pump delivering fluid under pressure to said constant counter-pressure hydraulic circuit and a motor for driving said pumps.

3. Device according to claim 1, comprising a pressure-release valve having a calibrated return spring which is disposed in the counter-pressure circuit, and means for adjusting the tension of said calibrated return spring of said valve and regulating the value of said counter-pressure.

4. Device according to claim 1, comprising an output regulating solenoid-operated valve inserted in the feed pressure circuit and an electrical circuit controlling the energization of said solenoid-operated valve, said electrical circuit comprising a feed contact actuated by a programming rod, whereby the feed output of said hydraulic cylinder is adjusted automatically to the value corresponding to fast or slow feed according as said output-regulating solenoid-operated valve is energized or not under the control of said feed contact.

5. Device according to claim 1, comprising a solenoid-operated valve for stroke-by-stroke operation, said valve being inserted in the feed pressure circuit, and an electrical circuit for controlling the energization of said stroke-by-stroke solenoid-operated valve, whereby said last-named valve will permit or prevent the passage of said feed output, according as it is energized or not.

6. Device according to claim 1, comprising a solenoid-operated cycle valve inserted in the feed pressure circuit, and an electrical circuit for controlling the energization of said solenoid-operated cycle valve, whereby said last-named valve will permit or prevent the passage of said feed output, according as it is energized or not.

7. Device according to claim 1, comprising a normally closed stroke-end valve, actuated by said hydraulic cylinder, said end-stroke valve communicating with the chamber of said hydraulic cylinder in which the feed pressure prevails, an adjustable stop for actuating the end position of the feed stroke of said end-stroke valve, an end-stroke control valve for detecting the passage of hydraulic fluid through said end-stroke valve and an end-stroke electrical contact actuated by said end-stroke control valve, the actuation of said contact corresponding to the end of the feed stroke.

8. Device according to claim 7, comprising a solenoid-operated cycle valve inserted in the feed pressure circuit to permit the feed output to flow therethrough when said last-named valve is operated, a cycle relay, a front contact of said last-named relay controlling the energization of said solenoid-operated cycle valve, a circuit for energizing said cycle relay which comprises in parallel a cycle-starting contact, a push-button for actuating said cycle-starting contact, and a receiving terminal adapted to receive a signal, a circuit for holding the energization of said cycle relay which comprises a front contact of said cycle relay, and an end-stroke back contact actuated by said end-stroke control valve.

9. Device according to claim 8, comprising a movable carriage, a spindle motor mounted on said carriage, a spindle motor programming rod, a spindle motor contact responsive to the actuation of said spindle motor programming rod during the travel of said movable carriage, said spindle motor contact being a two-position contact, a first electrical circuit closed when said spindle motor contact is in its first position, a spindle motor relay inserted in said first electrical circuit, a front contact of said spindle motor relay controlling the energization of said spindle motor, another electrical circuit closed when said spindle motor contact is in its other position, said second electrical circuit comprising a cycle relay front-contact, a push-button for stroke-by-stroke operation, a back contact controlled by said stroke-by-stroke push-button, and a relay for stroke-by-stroke operation, said device comprising on the other hand a solenoid-operated valve for stroke-by-stroke operation which is disposed in the feed pressure circuit so that said last-named valve permits the passage of said feed output when it is not energized, and a front contact of said stroke-by-stroke relay for controlling the energization of said stroke-by-stroke solenoid-operated valve, whereby, when the spindle motor programming rod switches said spindle motor contact to its other position, during the backward stroke in which said cycle relay back contact is closed, said stroke-by-stroke solenoid-operated valve is energized and the backward stroke is stopped.

References Cited by the Examiner
UNITED STATES PATENTS

| | | | |
|---|---|---|---|
| 2,437,603 | 3/48 | Hornfeck | 318—162 |
| 2,677,285 | 5/54 | Volk | 318—162 X |
| 2,726,358 | 12/55 | Barnhart | 318—17 |
| 2,860,571 | 11/58 | Seigle | 318—162 X |
| 2,932,088 | 4/60 | Knosp. | |
| 3,002,403 | 10/61 | Estabrook | 318—162 X |
| 3,002,404 | 10/61 | Estabrook | 318—162 X |
| 3,027,703 | 4/62 | Rayle | 318—162 X |
| 3,039,035 | 6/62 | Rudolf, et al. | 318—162 |

ORIS L. RADER, *Primary Examiner.*